United States Patent [19]

Nagai et al.

[11] Patent Number: 4,548,801

[45] Date of Patent: Oct. 22, 1985

[54] PLATE-LIKE BARIUM FERRITE PARTICLES FOR USE IN MAGNETIC RECORDING AND PROCESS FOR PRODUCING THE SAME

[75] Inventors: Norimichi Nagai; Nanao Horiishi, both of Hiroshima; Masao Kiyama; Toshio Takada, both of Kyoto, all of Japan

[73] Assignee: Toda Kogyo Corp., Hiroshima, Japan

[21] Appl. No.: 576,147

[22] Filed: Feb. 2, 1984

[30] Foreign Application Priority Data

Feb. 5, 1983 [JP] Japan ................................. 58-17792

[51] Int. Cl.$^4$ ...................... C01G 49/00; C04B 35/26
[52] U.S. Cl. ................................. 423/594; 252/62.63
[58] Field of Search ...................... 252/62.63; 423/594

[56] References Cited

U.S. PATENT DOCUMENTS 4,414,124 11/1983 Endo et al. ........................ 252/62.63

FOREIGN PATENT DOCUMENTS 56-155023 12/1981 Japan ................................... 423/594

Primary Examiner—Jack Cooper
Attorney, Agent, or Firm—Lyon & Lyon

[57] ABSTRACT

Disclosed herein are the plate-like barium ferrite particles for use in magnetic recording, showing a specific surface area of 11 to 50 m$^2$/g, a value of magnetization of higher than 25 emu/g in a magnetic field of 10 KOe and a coercive force of 600 to 1100 Oe, and a process for producing the same.

11 Claims, 5 Drawing Figures (×40000)

(×40000)

(x 20000)

1

PLATE-LIKE BARIUM FERRITE PARTICLES FOR USE IN MAGNETIC RECORDING AND PROCESS FOR PRODUCING THE SAME

BACKGROUND OF THE INVENTION

The present invention relates to plate-like barium ferrite particles for use in magnetic recording and a process for producing the same, and more in detail, the present invention relates to the plate-like barium ferrite particles ($BaO \cdot 6Fe_2O_3$) having a specific surface area of 11 to 50 $m^2/g$, a value of magnetization of higher than 25 emu/g in a magnetic field of 10 KOe and a coercive force of 600 to 1100 Oe, and the process for producing the plate-like barium ferrite particles, comprising the steps of autoclaving an aqueous alkaline suspension of pH of higher than 11 containing Fe(III) and Ba ions at an atomic ratio of 6:1 to 8:1 at a temperature of 110° to 190° C., to form fine particles of $2BaO \cdot 9Fe_2O_3$, and autoclaving the aqueous suspension containing the thus formed $2BaO \cdot 9Fe_2O_3$ at a temperature of 280° to 320° C.

In recent years, non-acicular ferromagnetic particles of a favorable dispersibility provided with a suitable coercive force(Hc) have been required as the magnetic material for recording, particularly as the magnetic material for the perpendicular magnetic recording. In general, as the non-acicular ferromagnetic particles, those of barium ferrite have been well known.

However, because of the excessively high coercive force thereof of higher than 3000 Oe in general, non-acicular ferromagnetic particles of barium ferrite are not favorable as the magnetic material for magnetic recording.

Accordingly, as a method for reducing the coercive force of the particles of barium ferrite, for instance, a process in which a part of Fe(III) of barium ferrite is substituted by other metal ions such as Co(II) and Ti(IV), thereby obtaining the magnetic material with a reduced coercive force while retaining the change of the saturation magnetization in a state as small as possible has been tried.

In addition, since the average size of the particles of barium ferrite are a few micrometers, at least about 1 micrometer, the dispersibility thereof in the case of preparation of a magnetic paint therefrom is poor, and such particles are not favorable as the magnetic material for magnetic recording.

Namely, as a magnetic material for magnetic recording, those of the particle size of as small as 0.05 to 0.5 micrometer have been demanded. The fact is clearly seen in Japanese Patent Application Laying-Open No. 53-20596 (1978) from the disclosure of "there is a difficulty in uniformly coating in the case where the particle size is over 0.5 micrometer . . .".

On the other hand, as a process for producing barium ferrite, a method of autoclaving an aqueous alkaline suspension containing Ba ions and Fe(III)(hereinafter simply referred to as the autoclaving method) has been known, and according to the autoclaving method, the particles of barium ferrite appear in the aqueous suspension as a precipitate. The thus precipitated particles exhibit ordinarily hexagonal plate-like shapes and their magnetic properties depend on the particles' size distribution and the average particle size which in turn depend on the conditions of their formation.

As a result of the present inventors' studies on the relationship between the conditions of formation of the barium ferrite particles, such as the ratio of Fe(III) to Ba ions, the concentration of the aqueous alkaline solution, the reaction temperature and the reaction time in the above-mentioned autoclaving method and the average particle size, the distribution of the particle size and the magnetic properties of the thus obtained barium ferrite particles in order to obtain the plate-like barium ferrite particles of an average particle size of about 0.05 to 0.5 micrometer and a very small coercive force with a value of magnetization(M) not remarkably reduced, the present invention has been attained.

SUMMARY OF THE INVENTION

In the first aspect of the present invention, there is provided plate-like barium ferrite particles having a specific surface area of 11 to 50 $m^2/g$, a value of magnetization of larger than 25 emu/g in the magnetic field of 10 KOe and a coercive force of 600 to 1100 Oe.

In the second aspect of the present invention, there is provided a process for production of plate-like barium ferrite particles having a specific surface area of 11 to 50 $m^2/g$, a value of magnetization of larger than 25 emu/g in the magnetic field of 10 KOe and a coercive force of 600 to 1100 Oe, comprising the steps of autoclaving an aqueous alkaline suspension containing Fe(III) and Ba ions in the atomic ratio of Fe(III) to Ba ion of 6:1 to 8:1 at a temperature of 110° to 190° C., to form fine particles of $2BaO \cdot 9Fe_2O_3$, and autoclaving the aqueous suspension containing the thus formed minute particles of $2BaO \cdot 9Fe_2O_3$ at a temperature of 280° to 320° C.

In the third aspect of the present invention, there is provided plate-like barium ferrite particles for use in magnetic recording, which show a specific surface area of 11 to 50 $m^2/g$, a value of magnetization of larger than 25 emu/g in a magnetic field of 10 KOe and a coercive force of 600 to 1100 Oe, produced by the process comprising the steps of autoclaving an aqueous alkaline suspension containing Fe(III) and Ba ions at an atomic ratio of Fe(III) to Ba ion of 6:1 to 8:1 to form fine particles of $2BaO \cdot 9Fe_2O_3$, and autoclaving the aqueous suspension containing the thus formed fine particles of $2BaO \cdot 9Fe_2O_3$ at a temperature of 280° to 320° C.

BRIEF EXPLANATION OF DRAWINGS

Of the attached drawings.

DETAILED EXPLANATION OF THE INVENTION

In the present invention, plate-like barium ferrite particles having a value of magnetization of higher than 25 emu/g even in a magnetic field of 10 KOe and a coercive force of 600 to 1100 Oe are obtained by autoclaving an aqueous suspension which contains Fe(III) and Ba ions in an atomic ratio of Fe(III) to Ba ion of 6:1 to 8:1 and shows pH of higher than 11 at a temperature of 110° to 190° C. to obtain fine particles of $2BaO \cdot 9Fe_2O_3$ once as a precipitate and further autoclaving the thus obtained, precipitated fine particles of $2BaO \cdot 9Fe_2O_3$ at a temperature of 280° to 320° C. Namely, the particles according to the present invention are the fine plate-like barium ferrite particles for use in magnetic recording, which show a value of BET specific surface area of 11 to 50 $m^2/g$, a value of magnetization of higher than 25 emu/g in a magnetic field of 10 KOe and a coercive force of 600 to 1100 Oe. The coercive force (Hc) and the magnetization(M) of the thus obtained plate-like barium ferrite particles of the present invention strongly depend on the BET specific surface area(S) thereof.

In the case where the average particle size of the thus produced plate-like barium ferrite particles is in a range of 0.05 to 0.5 micrometer and particularly, the value of BET specific surface area(S) thereof is in a range of 11 to 50 $m^2/g$, the coercive force(Hc) thereof becomes smaller than 1100 Oe with the increase of the value of BET specific surface area(S).

The relationship between the coercive force(Hc) and the value of BET specific surface area(S), and the relationship between the value of magnetization(M) and the value of BET specific surface area(S) of the plate-like barium ferrite particles, which have been found by the present inventors are explained while referring to the experimental results obtained by the present inventors as follows.

Figure 1:
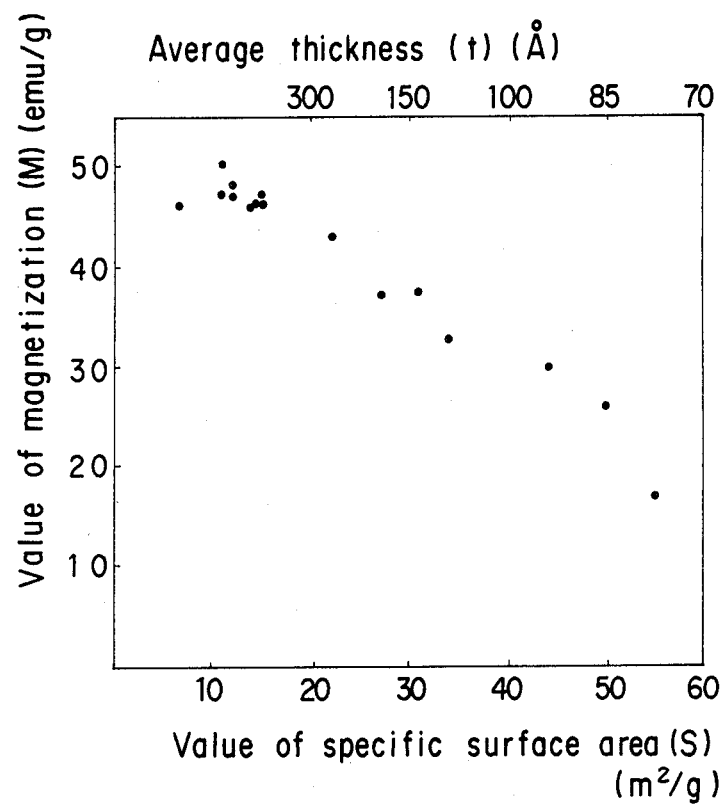
FIG. 1 shows the relationship between the value of magnetization(M) and the specific surface area(S) of the plate-like barium ferrite particles produced according to the present invention, and that between M value and the average thickness(t) thereof.
Figure 2:
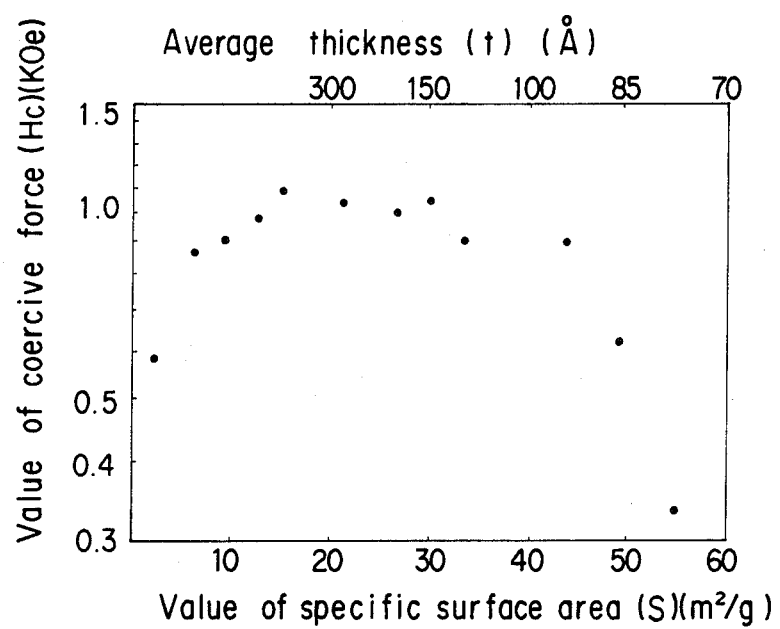
FIG. 2 shows the relationship between the coercive force(Hc) and S value, and that between Hc value and t thereof.

Of the attached drawings, FIGS. 1 and 2 show the value of magnetization(M) and the value of coercive force(Hc), respectively against the value of BET specific surface area(S) or the value of average thickness(t) of the plate-like barium ferrite particles which are 0.05 to 0.5 micrometer in the average particle diameter and higher than 65 emu/g in the value of saturation magnetization and have been packed at 1.6 $g/cm^3$ and magnetized in a magnetic field of 10 KOe, the value of the average thickness(t) being calculated while assuming the diameter of a circumcircle to the hexagonal plate-like barium ferrite particles to be 0.05 to 0.5 micrometer.

As is clearly seen in FIG. 1, the value of magnetization(M) tends to be reduced with the increase of the value of BET specific surface area(S) and the value of magnetization(M) becomes remarkably smaller when the value of BET specific surface area(S) becomes larger than 50 $m^2/g$.

As is clearly seen in FIG. 2, the coercive force(Hc) of the specimen of the plate-like barium ferrite particles of value of BET specific surface area in a range of 11 to 50 $m^2/g$ can be controlled within the range of 600 to 1100 Oe by changing the conditions of formation thereof.

It is important in the present invention that the starting substances are once converted to a precipitate of fine particles of $2BaO \cdot 9Fe_2O_3$ and the thus obtained precipitate is subjected to autoclaving in an aqueous state at a temperature of 280° to 320° C., thereby converting the particles of $2BaO \cdot 9Fe_2O_3$ into the particles of $BaO \cdot 6Fe_2O_3$ (barium ferrite).

Namely, in the present invention, by producing the plate-like barium ferrite particles of a BET specific surface area of 11 to 50 $m^2/g$, the plate-like barium ferrite particles small in coercive force are obtained. Since the particles of $2BaO \cdot 9Fe_2O_3$ are extremely fine and uniform in the size and shape thereof, in the case where the particles of $2BaO \cdot 9Fe_2O_3$ are used for forming the particles of $BaO \cdot 6Fe_2O_3$, it is easy to obtain the fine and uniform particles of $BaO \cdot 6Fe_2O_3$ with the possible control of the shape and form of the product. Accordingly, the plate-like barium ferrite particles of a value of BET specific surface area(S) in a range of 11 to 50 $m^2/g$ are easily obtainable.

As a source of Fe(III) in the present invention, ferric chloride, ferric nitrate or particles of gamma-FeOOH may be used, and as a source of Ba ions in the present invention, $Ba(OH)_2$ or $BaO$ may be used.

The atomic ratio of Fe(III) to Ba ions in the present invention is 6:1 to 8:1 and with the raise of pH of the reaction system and the reaction temperature, the preferable ratio tends nearer to 8:1.

The present invention with the above-mentioned construction exhibits the following effects.

Namely, according to the present invention, the fine plate-like barium ferrite particles of a value of BET specific surface area of 11 to 50 $m^2/g$, preferably 15 to 40 $m^2/g$, a value of magnetization of higher than 25 emu/g, preferably higher than 45 emu/g in a magnetic field of 10 KOe, a value of coercive force of 600 to 1100 Oe, preferably 600 to 800 Oe, an average particle diameter of 0.05 to 0.5 micrometer, preferably 0.08 to 0.2 micrometer and favorable in dispersibility can be obtained, and the thus obtained fine plate-like barium ferrite particles provided with the above-mentioned properties are favorably suitable as the magnetic material for magnetic recording which have recently been demanded, particularly as the magnetic material for perpendicular magnetic recording.

The present invention will be explained more in detail while referring to the following non-limitative examples, wherein the value of magnetization of the products according to the present invention and of the product obtained in Comparative Example has been determined on the specimen in a powdery state in a magnetic field of 10 KOe, and the value of coercive force thereof has been determined on the specimen at a degree of packing of 1.6 $g/cm^3$.

EXAMPLE 1

Into 0.7 liter of decarbonated water in an autoclave, 0.640 mol of $Fe(NO_3)_3$, 0.08 mol of $Ba(OH)_2$ and 2.97 mol of NaOH were added, and after heating the suspension in the autoclave to 115° C., the suspension was maintained at the temperature for 5 hours, thereby making the formation of particles. The particles obtained by drawing a part of the reaction suspension out from the autoclave were identified as $2BaO \cdot 9Fe_2O_3$ as a result of fluorescent X-ray analysis.

Figure 3:
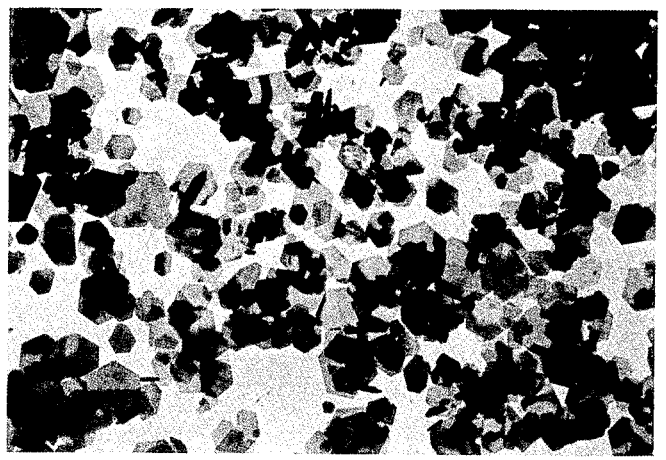
FIG. 3 and FIG. 4 are electronmicrophotographs of the plate-like barium ferrite particles respectively obtained in Examples 1 and 2.

By maintaining the reaction suspension further for 5 hours at an elevated temperature of 300° C., a ferromagnetic liver-coloured precipitate was formed, and after cooling the reaction suspension to room temperature, the ferromagnetic liver-coloured precipitate was collected by filtering the reaction suspension, and after treating the precipitate with one liter of aqueous 3MOL solution of $HClO_4$ and washing the thus treated precipitate well with water, the thus washed precipitate was treated with acetone, and a part thereof was dried at 80° C. FIG. 3 is an electronmicrophotograph (of magnification of 40,000) of the thus obtained dried powder which showed a value of S of 21.7 $m^2/g$.

As seen in FIG. 3, the powder was composed of hexagonal plate-like particles uniform in the particle size of an average diameter of 0.1 micrometer. The value of magnetization in a magnetic field of 10 KOe was 43.6 emu/g according to VSM, and the coercive force thereof was 930 Oe at a state of packing of 1.6 g/cm$^3$.

EXAMPLE 2

After adding 0.64 mol of FeCl$_3$, 0.08 mol of Ba(OH)$_2$.8H$_2$O and 2.97 mol of NaOH into 0.7 liter of decarbonated water in an autoclave, the suspension was heated to 170° C. and was maintained at the temperature for 3 hours under the mechanical stirring at a revolution of 600 r.p.m. to form particles. The particles obtained by drawing a part of the reaction suspension out from the autoclave were identified as 2BaO.9Fe$_2$O$_3$ as a result of fluorescent X-ray analysis.

Figure 4:
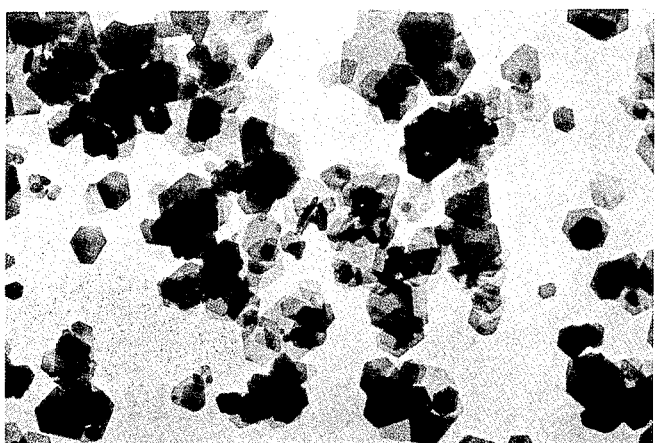

By maintaining the reaction suspension further for 3 hours at an elevated temperature of 320° C., a ferromagnetic liver-coloured precipitate was formed. After cooling the reaction suspension, it was treated by the same procedures as in Example 1, thereby obtaining a ferromagnetic powdery, liver-coloured product of 11.9 m$^2$/g in S. FIG. 4 is an electron-microphotograph of the thus obtained powder magnified by 40,000 times. As seen in FIG. 4, the powder was composed hexagonal plate-like particles of an average particle diameter of 0.25 micrometer. The product showed the value of M of 48 emu/g in a magnetic field of 10 KOe and the value of Hc of 890 Oe at a state of packing of 1.6 g/cm$^3$.

In addition, in barium ferrite, the direction of C axis is the direction of easy magnetization, and in the barium ferrite obtained according to the present invention, the plate-like particles were oriented by applying a pressure thereon, and by sintering the pressed platy particles at 800° to 1000° C., a sintered body of a large Hc with the oriented particles was obtained.

COMPARATIVE EXAMPLE 1

In the same procedures as in Example 1, except for not maintaining for 5 hours at 115° C. but maintaining the suspension directly for 5 hours at 300° C., a powdery ferromagnetic powder of liver-colour which showed the value of S of 5.6 m$^2$/g was obtained.

Figure 5:
FIG. 5 is an electronmicrophotograph of the barium ferrite particles obtained in Comparative Example 1.

FIG. 5 is an electronmicrophotograph of the thus obtained ferromagnetic powder magnified by 20,000 times, and as is shown in FIG. 5, the product consisted of hexagonal plate-like particles of an average particle diameter of 1.0 micrometer. The product showed a M value of 49.6 emu/g in a magnetic field of 10 KOe, and a value of Hc of 1404 Oe in a state of packing of 1.6 g/cm$^3$.

What is claimed is:

1. Plate-like barium ferrite particles of the formula BaO.6 Fe$_2$O$_3$ for use in magnetic recording, exhibiting a specific surface area of 11 to 50 m$^2$/g, a magnetization of higher than 25 emu/g in a magnetic field of 10 kOe and a coercive force of 600 to 1100 Oe.

2. Plate-like barium ferrite particles according to claim 1, exhibiting a specific surface area in a range of 15 to 40 m$^2$/g.

3. Plate-like barium ferrite particles according to claim 1, exhibiting a magnetization of higher than 45 emu/g in a magnetic field of 10 KOe.

4. Plate-like barium ferrite particles according to claim 1, exhibiting a coercive force in a range of 600 to 800 Oe.

5. A process for producing plate-like barium ferrite particles of the formula BaO.6Fe$_2$O$_3$ for use in magnetic recording exhibiting a specific surface area in a range of 11 to 50 m$^2$/g, a magnetization of higher than 25 emu/g and a coercive force in a range of 600 to 1100 Oe, comprising the steps of autoclaving an aqueous alkaline suspension of pH of higher than 11 which contains Fe(III) and Ba ions at an atomic ratio of Fe(III) to Ba ions of 6:1 to 8:1 at a temperature of 110° to 190° C., to form fine particles of 2BaO.9Fe$_2$O$_3$, and then autoclaving said aqueous suspension containing the thus formed 2BaO.9Fe$_2$O$_3$ at a temperature of 280° to 320° C., thereby converting said fine particles of 2BaO.9Fe$_2$O$_3$ into said plate-like barium ferrite particles.

6. A process according to claim 5, wherein the source of Fe(III) is ferric chloride, ferric nitrate or gamma-FeOOH.

7. A process according to claim 5, wherein the source of Ba ions is Ba (OH)$_2$ or BaO.

8. Plate-like barium ferrite particles of the formula BaO.6Fe$_2$O$_3$ for use in magnetic recording exhibiting a specific surface area in a range of 11 to 50 m$^2$/g, a magnetization of higher than 25 emu/g in a magnetic field of 10 KOe and a coercive force in a range of 600 to 1100 Oe, produced by a process comprising the steps of autoclaving an aqueous alkaline suspension of pH of higher than 11, containing Fe(III) and Ba ions at an atomic ratio in a range of 6:1 to 8:1 at a temperature of 110° to 190° C., to form particles of 2BaO.9Fe$_2$O$_3$, and then autoclaving the aqueous suspension containing the thus formed 2BaO.9Fe$_2$O$_3$ at a temperature of 280° to 320° C. thereby converting said fine particles of 2BaO.9-Fe$_2$O$_3$ into said plate-like barium ferrite particles.

9. Plate-like barium ferrite particles according to claim 8, exhibiting a specific surface area in a range of 15 to 40 m$^2$/g.

10. Plate-like barium ferrite particles according to claim 8, exhibiting a magnetization of higher than 45 emu/g in a magnetic field of 10 KOe.

11. Plate-like barium ferrite particles according to claim 8, exhibiting a coercive force in a range of 600 to 800 Oe.

* * * * *